(12) United States Patent
Simon

(10) Patent No.: US 8,680,027 B2
(45) Date of Patent: Mar. 25, 2014

(54) METHOD AND COMPOSITION FOR TREATMENT OF A WELL

(75) Inventor: James Simon, Le Plessis Robinson (FR)

(73) Assignee: Schlumberger Technology Corporation, Sugar Land, TX (US)

(*) Notice: Subject to any disclaimer, the term of this patent is extended or adjusted under 35 U.S.C. 154(b) by 971 days.

(21) Appl. No.: 12/062,620

(22) Filed: Apr. 4, 2008

(65) Prior Publication Data

US 2008/0261834 A1      Oct. 23, 2008

(30) Foreign Application Priority Data

Apr. 17, 2007   (EP) ..................... 07290471

(51) Int. Cl.
*C09K 8/68* (2006.01)
*C09K 8/60* (2006.01)
*C09K 8/588* (2006.01)
*C09K 8/74* (2006.01)
*E21B 43/04* (2006.01)
*E21B 43/26* (2006.01)
*B32B 3/00* (2006.01)

(52) U.S. Cl.
USPC ........... 507/219; 507/203; 507/221; 507/269; 166/278; 166/305.1; 428/71

(58) Field of Classification Search
USPC ................. 507/219, 221, 203, 269; 428/71; 166/278, 305.1
See application file for complete search history.

(56) References Cited

U.S. PATENT DOCUMENTS

| | | | | |
|---|---|---|---|---|
| 3,336,979 | A | * | 8/1967 | Ingraham et al. ............. 166/283 |
| 4,888,240 | A | | 12/1989 | Graham |
| 6,569,814 | B1 | | 5/2003 | Brady et al. |
| 6,631,764 | B2 | | 10/2003 | Parlar et al. |
| 6,749,025 | B1 | | 6/2004 | Brannon et al. |
| 6,772,838 | B2 | | 8/2004 | Dawson et al. |

FOREIGN PATENT DOCUMENTS

| | | |
|---|---|---|
| EP | 1166866 | 1/2002 |
| EP | 1840324 | 10/2007 |
| EP | 1840325 | 10/2007 |
| GB | 471637 | 9/1937 |
| WO | 03/008756 | 1/2003 |

* cited by examiner

*Primary Examiner* — Bijan Ahvazi
*Assistant Examiner* — Atnaf Admasu
(74) *Attorney, Agent, or Firm* — Michael Dae

(57) ABSTRACT

The invention provides a material comprising: a core made of a solid material; a first layer surrounding the core made of a swellable material able to swell in contact with a fluid; a second layer surrounding the first layer made of a glue material able to glue to a third element.

9 Claims, 6 Drawing Sheets

METHOD AND COMPOSITION FOR TREATMENT OF A WELL

CROSS REFERENCE TO RELATED APPLICATIONS

This application claims priority to European patent application EP 07290471.7 filed Apr. 17, 2007.

FIELD OF THE INVENTION

The present invention broadly relates to well services. More particularly the invention relates to compositions for treating downhole wells in a subterranean reservoir, such as for instance an oil and gas reservoir or a water reservoir. For example, the composition may be useful for sand control.

DESCRIPTION OF THE PRIOR ART

After a well has been drilled, the conventional practice in the oil industry consists in lining the well with a metal casing. The casing is lowered into the hole and cement is pumped inside the casing and returns through the annulus where it is allowed to set. The lining serves a dual purpose: preventing the borehole walls from collapsing and isolating the various geological strata and thus, avoiding exchange of fluids between them. Furthermore, it can be useful, for different reasons, to fill the well with a permeable screen (meaning not impermeable like a metal casing) such as a perforated tubular, a tubular with other openings, a slotted liner or an expandable screen. Use of such permeable screens allows for example oil to pass from production zones into the centre of the hole whilst the permeable screens filter out particulate debris. Also to enhance well productivity, perforating, fracturing or acidising can be performed in the well to increase the oil flow. Overall the well completion provides well consolidation and zonal isolation whilst maximising hydrocarbon production. In some cases it is known that during production of the well formation sand or debris will be produced and the initial completion will contain a filtering mechanism such as a pre-packed screen or gravel-pack completion. In other cases unpredicted sand production may occur during the life of the well for various reasons, and a permeable screen has to be created in the well quite quickly and in a controlled way, sufficiently resistant to maintain the sand or wellbore debris in the well and sufficiently permeable to ensure continued production of oil. For example, a zone may be producing sand and creating too much debris and needs to be isolated to maintain an efficient operation. It is therefore a purpose of the invention to make a composition and associated method able to build a permeable screen.

FIGS. 1A, 1B and 1C show a system according to prior art. FIG. 1A shows conventional resin coated particles in a suspension of, for example, polymer fluid. The system is made of particles made of proppant surrounded by a resin. This suspension can be pumped into a well as the particles are well dispersed and are separated from each other. However, in this state the particles cannot form a solid mass unless the grains are allowed to contact each other. In FIGS. 1B and 1C the particles are in contact and can therefore form a solid mass with a measurable compressive strength. This situation can be reached from the dispersed suspension by two mechanisms. In one case sedimentation of the particles can occur leaving a layer of free fluid at the surface (FIG. 1B). In a second case dehydration of the suspension, e.g. from fluid loss into the formation, will cause the particles to contact one another (FIG. 1C). The problem is that in both cases complex action is required from the suspension, sedimentation or dehydration, to generate a solid mass and it is difficult to predict the behaviour of the suspension as it is a function of wellbore conditions e.g. wellbore temperature, formation permeability. It is proposed in the current invention a material and a more controlled method to generate a permeable, consolidated mass.

SUMMARY OF THE INVENTION

The invention provides a material comprising: a core made of a solid material; a first layer surrounding the core made of a swellable material able to swell in contact with a fluid; a second layer surrounding the first layer made of a glue material able to glue to a third element. Preferably, materials according to the invention are mixed together and are present as a solid suspension that can be pumped into a wellbore and that will set to form a permeable, consolidated mass. Accordingly, advantages are that conventional pumping techniques can be used to place the materials in the well without increasing the cost of the placement; also the set material will be resistant to formation fluids unlike prior art inventions, and the material will set into a consolidated mass without requiring either sedimentation or dehydration of suspension.

Preferably, the second layer is further able to retard contact of the fluid with the first layer and is flexible enough to enlarge with the first layer. In such a way a more controlled process of swelling is achieved. The fluid is any taken from the list constituted of: water, oil, aqueous, non-aqueous fluids, multiphasic fluids e.g. emulsions of two effectively immiscible fluids, foams and a combination thereof. The fluid may be a carrier fluid forming the suspension; it can also be a fluid naturally present in the well or put in the well at a predetermined moment (for example post flush) or injected at a location through a downhole injection process. Also, the third element is any taken from the list constituted of: a material according to anyone of claims 1 to 4, a granular material made up of rock particles, a granular material made up of synthetic or natural particles, and a combination thereof. It may be possible to use polymeric particles such as styrene divinylbenzene beads and other polymers as well as natural minerals and ceramics. Use of coated walnut shells may be possible and other ideas e.g. disclosed in U.S. Pat. No. 6,772,838 or U.S. Pat. No. 6,749,025.

Advantageously, the diameter of the core is between 200 to 1600 micrometers, the thickness of the first layer is between 40 to 120 micrometers, and the thickness of the second layer is between 20 to 60 micrometers. And the thickness of the first layer is between 50 to 300 micrometers after swelling from contact with the carrier fluid.

According to a further aspect of the invention, a system is described comprising at least a material as described above and a third element. The system according to the invention is for a solid suspension that can be pumped into a wellbore and that will set to form a permeable, consolidated mass. Accordingly, advantages are that better performance can be achieved with the system of the invention; also conventional pumping techniques can be used to place the system in the well without increasing cost of the placement job. Cementing techniques as described in prior art can be used with conventional circulation, as well as reverse circulation for placement of the suspension. Also the system is made of material as described above along with other cheaper materials e.g. sand grains, cenospheres . . . which allows the complete system to be cheaper than other solutions. The set system will be resistant to formation fluids unlike prior art inventions, and the system will set into a permeable mass without requiring either sedimentation or dehydration of the suspension.

The third element is any taken from the list constituted of: a granular material made up of rock particles, a granular material made up of synthetic or natural particles, and a combination thereof. Also, preferably the synthetic or natural particles are any taken in the list constituted of: polymeric particles such as styrene divinylbenzene beads, other polymers as well as natural minerals and ceramics and a combination thereof. The system is preferably embodied as a suspension and comprises a second fluid with no reactivity or at least with little reactivity with said first layer, such that said system forms compositions pumpable in a well. Preferably, the system comprises further the fluid, such that said system forms a suspension pumpable in the well. The fluid can be directly added as second fluid and this way can be a carrier fluid. However, in this configuration the fluid should have little reactivity with the first layer so the material swells after a certain time or the second layer should be sufficiently protective to retard the swelling of the material. Preferably, the system has particles with an average diameter between 300 to 1400 micrometers.

Finally, according to the last aspect of the invention a method to treat a zone of the well is disclosed comprising the steps of: selecting a zone to treat; pumping a material or a system as described above in or near said zone; allowing the first layer to swell when in contact with the carrier fluid in said zone such that a barrier is formed with said material or system. A further step of activation of the material can be added, so the first layer is able to swell.

Preferably, the barrier is formed with said material or system and an element already present in the well. For example, the element can be a perforated pipe. Advantageously, the barrier is further permeable, or can be made permeable, to fluid as oil or water. Preferably, the method applies to sand control.

BRIEF DESCRIPTION OF THE DRAWINGS

Further embodiments of the present invention can be understood with the appended drawings.

DETAILED DESCRIPTION

Figure 1A:
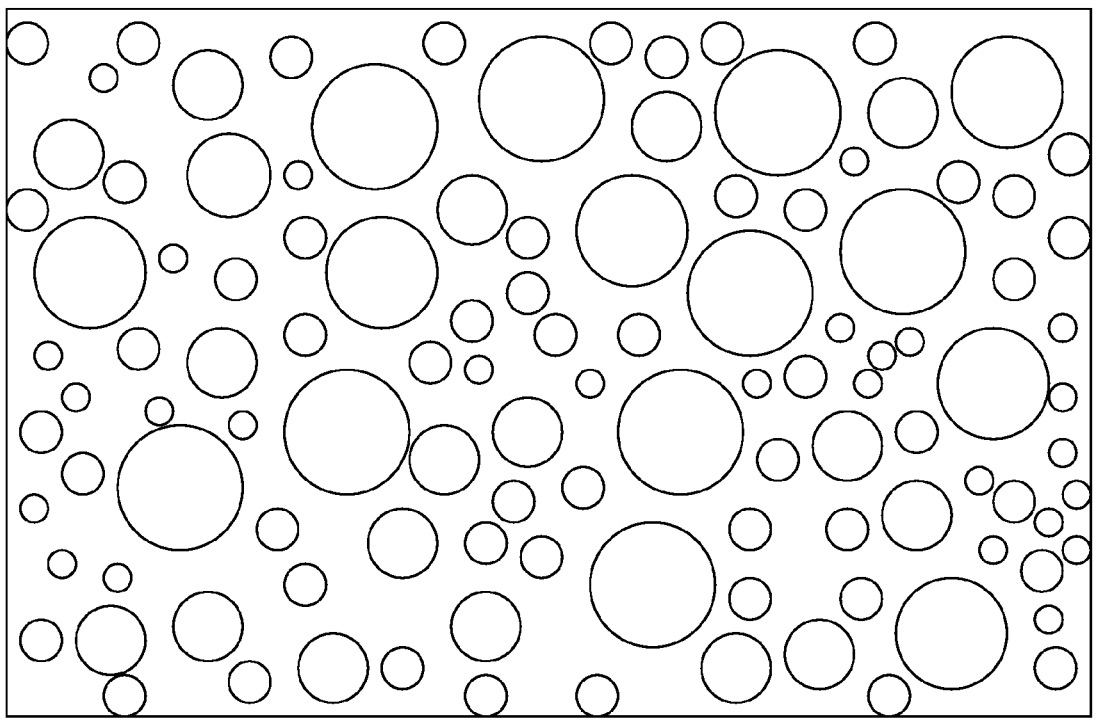
FIGS. 1A, 1B and 1C describe a material embodied in a system according to prior art.
Figure 1B:
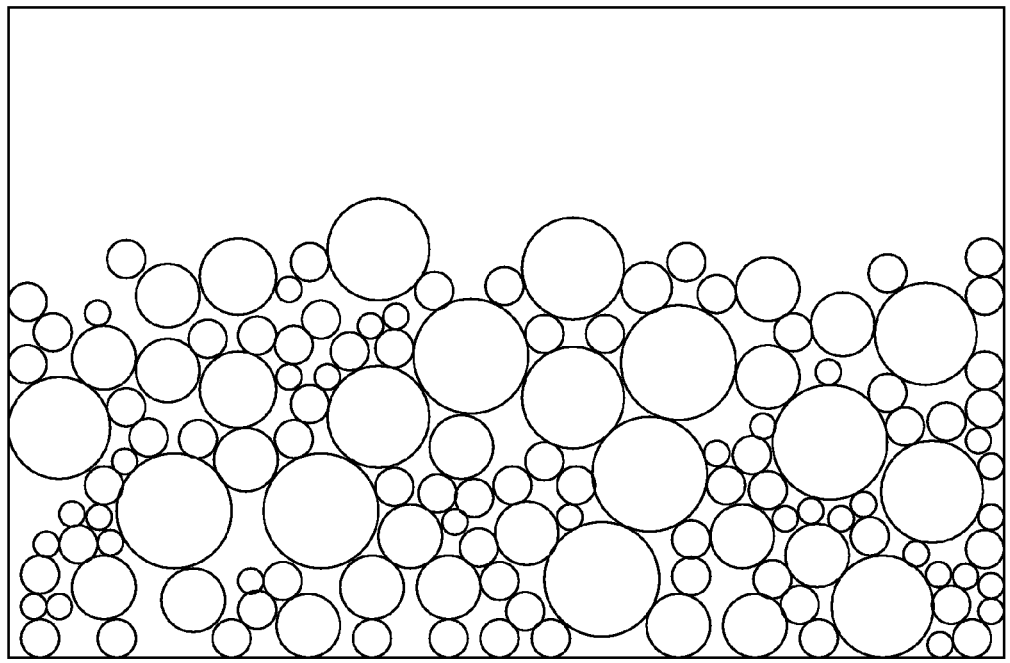
Figure 1C:
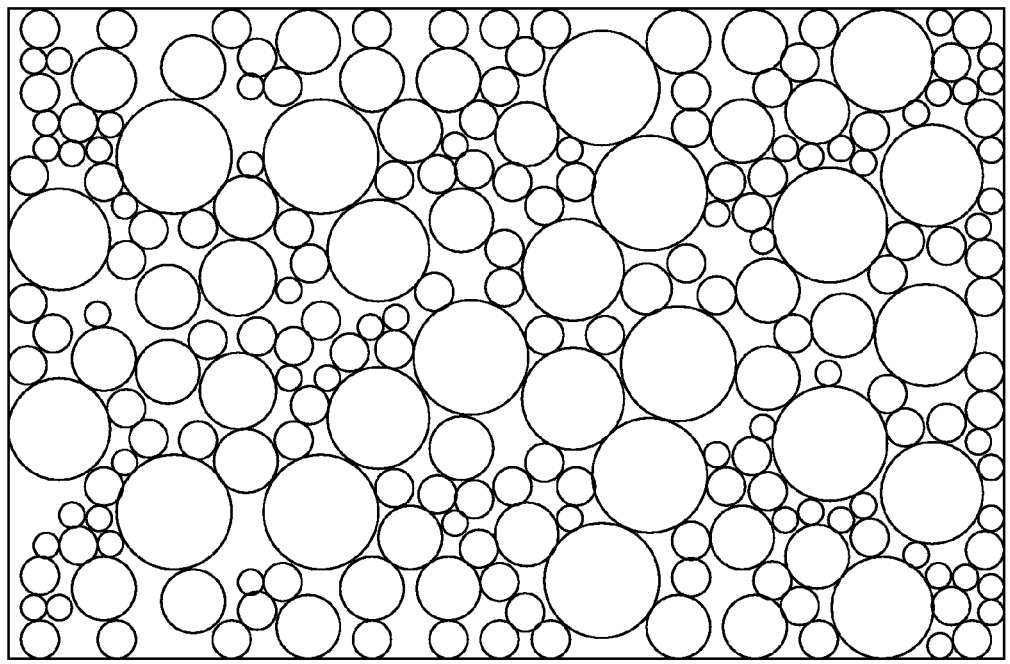
Figure 2A:
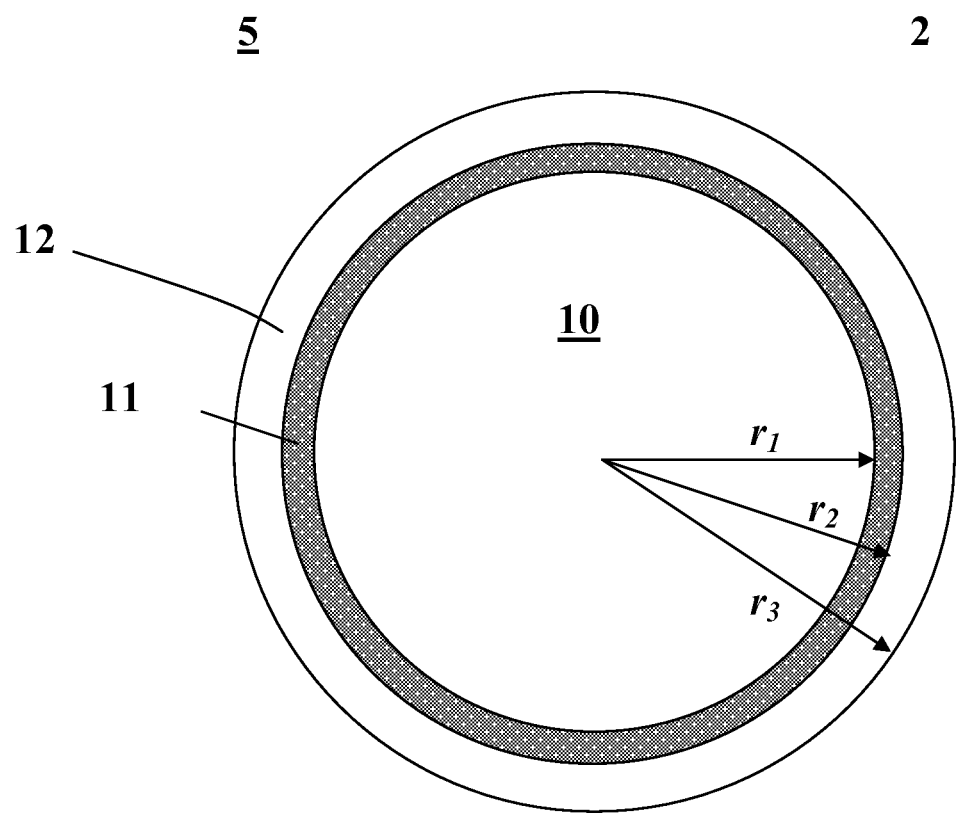
FIGS. 2A and 2B show the material according to the invention.

The present invention involves the use of a material 2 preferably substantially spherical able to react when in contact with a fluid 5. Other types of geometry are possible, for example material embodied as fibers or rods. FIG. 2A shows such a material according to the invention. The fluid is any type of fluid, which may be liquid or gaseous or multi-phasic. Preferably, the fluid is aqueous or non-aqueous e.g. water, oil or a combination thereof. The material 2 is made of a core 10 of a solid substrate. Solid substrate means that the core is able to remain in solid state under downhole conditions (pressure and temperature) and under the influence of downhole fluids of all types (oil, water, gas) for a sufficient time compared to the life of the well. The core is preferably spherical or ovoidal, and made of a ceramic or similar synthetic material or a natural mineral such as sand. For example core can be a synthetic ceramic proppant, e.g. Carbolite. The diameter of the core is preferably between 200 to 1600 micrometers ($2 \cdot r_1$ on the FIG. 2A).

A first layer 11 surrounds the core and is made of a swellable material able to swell in contact with the fluid 5. Swellable materials means as defined, that the material can swell, i.e. increases its volume or its apparent volume like a sponge. The first layer is preferably a uniform layer coating the core, with a thickness between 40 and 120 micrometers ($r_2-r_1$ on the FIG. 2A). The first layer may be for example a neoprene rubber that will swell with hydrocarbon, in the case the carrier fluid is liquid hydrocarbon based. Other possible oil swellable materials which swell when in contact with oil are: natural rubber, nitrite rubber, hydrogenated nitrite rubber, acrylate butadiene rubber, poly acrylate rubber, butyl rubber, brominated butyl rubber, chlorinated butyl rubber, chlorinated polyethylene, styrene butadiene copolymer rubber, sulphonated polyethylene, ethylene acrylate rubber, epichlorobydrin ethylene oxide copolymer, ethylene-propylene-copolymer (peroxide cross-linked), ethylene-propylene-copolymer (sulphur cross-linked), ethylene-propylene-diene terpolymer rubber, ethylene vinyl acetate copolymer, fluoro rubbers, fluoro silicone rubber, and silicone rubbers. The first layer may be for example a vinylacetate-acrylate copolymer that will swell in contact with water, in the case the carrier fluid is water based. Other possible water swellable materials which swell when in contact with water are: starch-polyacrylate acid graft copolymer, polyvinyl alcohol cyclic acid anhydride graft copolymer, isobutylene maleic anhydride, acrylic acid type polymers, polyethylene oxide polymers, carboxymethyl cellulose type polymers, starch-polyacrylonitrile graft copolymers and the like and highly swelling clay minerals such as Sodium Bentonite (having as main ingredient montmorillonite). Other mineral swelling materials can be oxides which hydrate to form hydroxides (eg MgO, CaO, NiO), materials such as Plaster of Paris $CaSO_4 \cdot \frac{1}{2}H_2O$ or cement. Other types of swellable material are described in patent application WO2003008756.

A second layer 12 surrounds the first layer and is made of a glue material able to glue either to a material of the same type or to a particle present in the well as for example any type of granular material made up of fine rock particles or synthetic particles sufficiently solid. Glue materials means as defined, that the material can glue or be fixed for a certain period of time, preferably sufficiently long time compared to the life of the well. The glue materials are self-activated to glue, or activated via an external factor e.g. temperature, U.V. radiation, pH, or chemical. The second layer is preferably a uniform layer coating the first layer, with a thickness between 20 to 60 micrometers ($r_3-r_2$ on the FIG. 2A). The second layer may be for example a traditional resin e.g. epoxy or furan resin, a tacky layer that has sufficient adhesive properties to hold the grain or grains in place or any other type of glue. Other examples of resin may be organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether resin, and combinations thereof.

Preferably the second layer 12 is also a protective coating protecting the first layer from contact with the fluid 5 or at least retarding the fluid 5 to contact the first layer. In a first embodiment, the first layer can be activated to swell by unprotecting the first layer either chemically (by adding a chemical substance to allow the second layer to be permeable to the fluid) or physically (with UV radiation or a tool to allow the second layer to be permeable to the fluid). In a second embodiment, the second layer only retards the contact of the first layer and the fluid either the second layer is partially permeable ensuring entry of the fluid after a certain time or the second layer is degradable or at least changing to be permeable only after a certain time period.

Preferably the second layer 12 is also flexible enough to enlarge with the first layer. Effectively, if the first layer swells, its apparent volume will increase and consequently the second layer will have to coat a larger surface. In a first embodiment, the second layer is not necessarily flexible, swelling of the first layer provoking the break of the second layer, however sufficient material of the second layer remain on the first layer to act as glue. In a second embodiment, as mentioned above, the second layer is flexible, swelling of the first layer provoking also enlargement of the second layer too. In this second embodiment appearance of the material remain the same, only the volume changes.

Figure 2B:
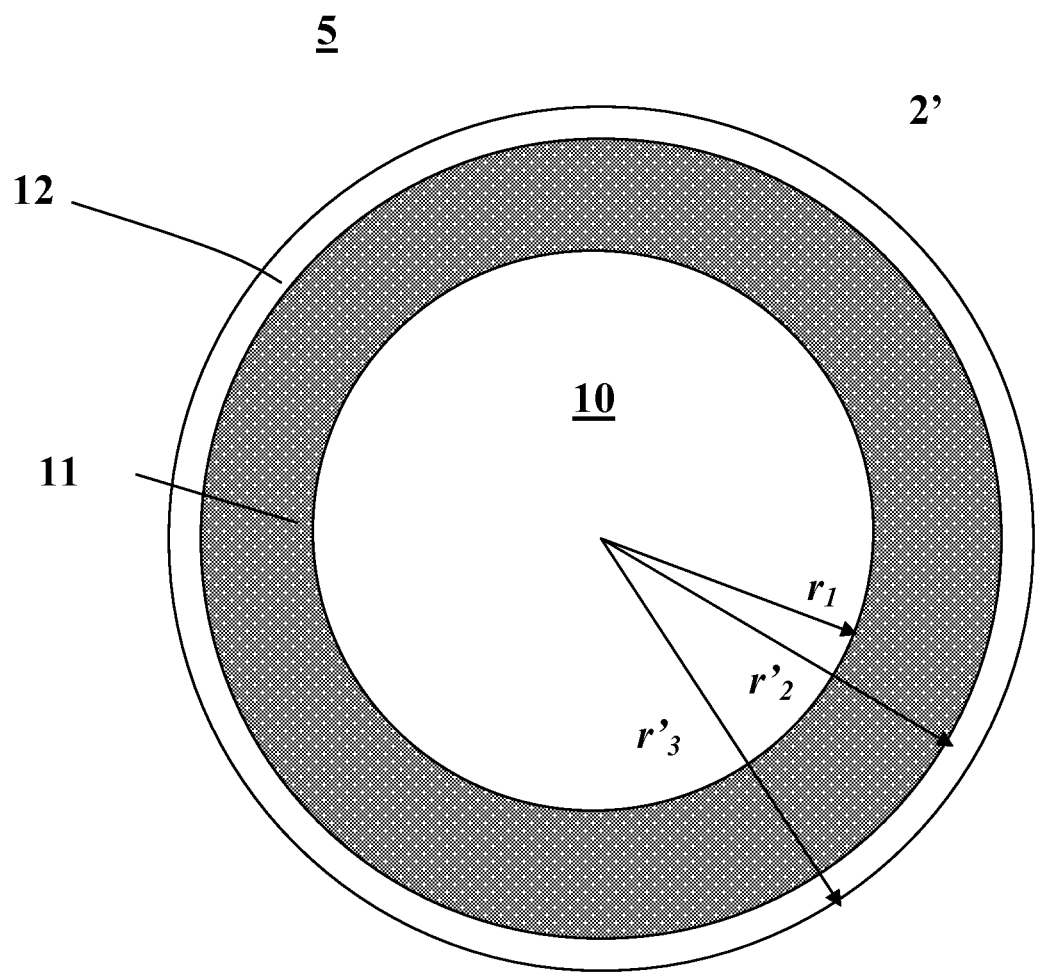

FIG. 2B shows the swelled material 2' i.e. after swelling when in contact with the fluid 5. Preferably, the swelling material is able to increase its volume or its apparent volume in such a way that the first layer is still a uniform layer coating the core, with a thickness between 50 to 300 micrometers ($r'_2-r_1$ on the FIG. 2B). Preferably for this embodiment the swellable material is a crosslinked polymeric material one being predominantly hydrophobic in the case the fluid is liquid hydrocarbon based, and the other being predominantly hydrophilic in the case the carrier fluid is water based.

Figure 3A:
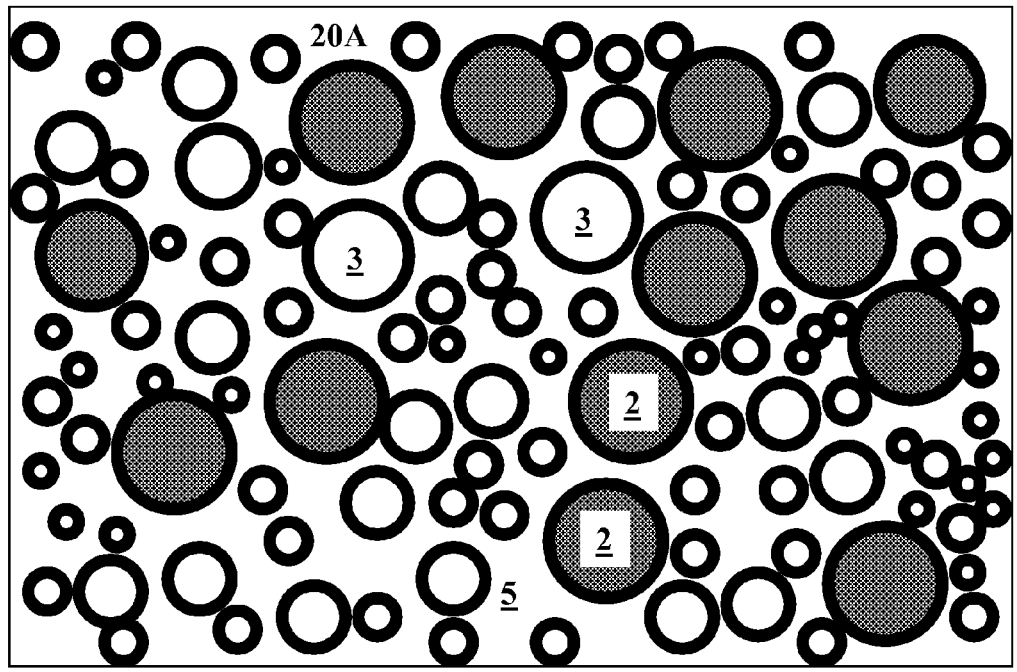
FIGS. 3A and 3B show the system according to the invention in a first embodiment.
Figure 3B:
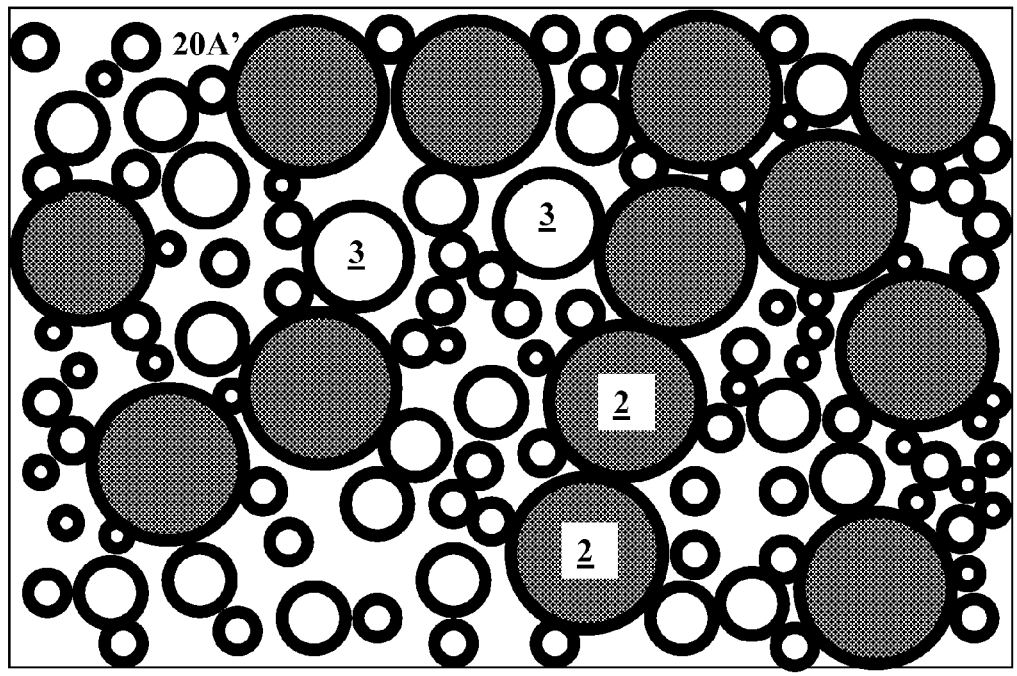

FIG. 3A shows a system 20A of the invention in a first embodiment. The system 20A is made of material 2 disclosed previously combined with a third element 3 embodied as a granular material made up of rock particles, or a granular material made up of synthetic or natural particles, or a combination thereof. For example, the third element can be sand or microspheres. FIG. 3B shows the swelled system 20A' i.e. after swelling when in contact with the fluid 5. The material 2 swells to form a swelled material 2' and interacts with other particles to set into a permeable mass. The swelled system 20A' develops sufficient compressive strength to become a barrier for certain type of particles, as sand for example but remains permeable for fluids as oil or water. Accordingly, the ratio of material 2 versus third element has to be chosen in such a way that the swelled materials 2' ensure a sufficient compressive strength for all the swelled system 20A'. The system is embodied as a suspension and comprises a second fluid with no reactivity or at least with little reactivity with the first layer, such that the system forms compositions pumpable in a well. So the rheology of the system can be controlled. The second fluid may be any type of aqueous, non-aqueous fluids, or multi-phasic fluids. In the embodiment here disclosed, the system comprises further the fluid 5, such that the system forms a suspension pumpable in the well. Effectively, the fluid 5 is directly added as second fluid and in this way represents the carrier fluid. In this embodiment, the carrier fluid has little reactivity with the first layer so the material swells after a certain period of time. Also, the second layer could be enough protective to retard the swelling of the material. The system is made of particles of material with an average diameter of the core between 300 to 1400 micrometers and with third element, substantially spherical, with also an average diameter between 300 to 1400 micrometers.

According to a further embodiment not shown on Figure, the system is made of material 2 disclosed previously combined with a third element 3 embodied as a fiber, a rod, a disc, or a combination thereof. The material 2 swells to form a swelled material 2' and interacts with other elements present (i.e. fiber, rod, or disc) to set into a permeable mass. Accordingly, the ratio of material 2 versus third element has to be chosen in such a way that the swelled materials 2' ensure a sufficient compressive strength for all the swelled system.

According to a further embodiment also not shown on Figure, the system is made of material 2 disclosed previously combined with a third element 3 embodied as a degradable particle. The degradable particles are used for example to allow forming a suspension that may be pumpable and are degraded during or after the swelling. For example, the degradable material is a component made of polymer which is self-degradable. The degradation products may be acids. And in this way, the acid may have a combined effect and may activate the resin of the second layer to develop glue properties. At that time, the material 2 swells to form a swelled material and interacts with the other swelled materials to set into a permeable mass, the degradable particles being eliminated. The swelled system develops sufficient compressive strength to become a barrier for certain type of particles, as sand for example but remains permeable for fluids as oil or water. Accordingly, the ratio of material 2 versus degradable particle has to be chosen in such a way that the swelled materials 2' ensure a sufficient compressive strength for all the swelled system.

According to a further embodiment also not shown on Figure, the system is made of material 2 disclosed previously combined with a third element embodied as a second swelling material that can be activated independently of the swelling material of first layer 11 through some mechanism of activation by a third fluid e.g. overflush with a special solvent (something not normally found in a wellbore). This system may be useful for methods where certain parts of the wellbore may be shut off if necessary later on. Also, the system may comprise a third element embodied as a particle that acts to shut off the permeability. Later, it can be shrunk, dissolved or removed from certain locations by a post treatment.

According to a further embodiment also not shown on Figure, the system is made of material 2 disclosed previously combined with a third element embodied as or including scale inhibitors, corrosion inhibitors, tracers, asphaltene inhibitors and other type of production chemical, for example for controlling or treating properties of the production fluid(s).

The various embodiments disclosed herewith can be combined together to form another embodiment type.

Figure 4A:
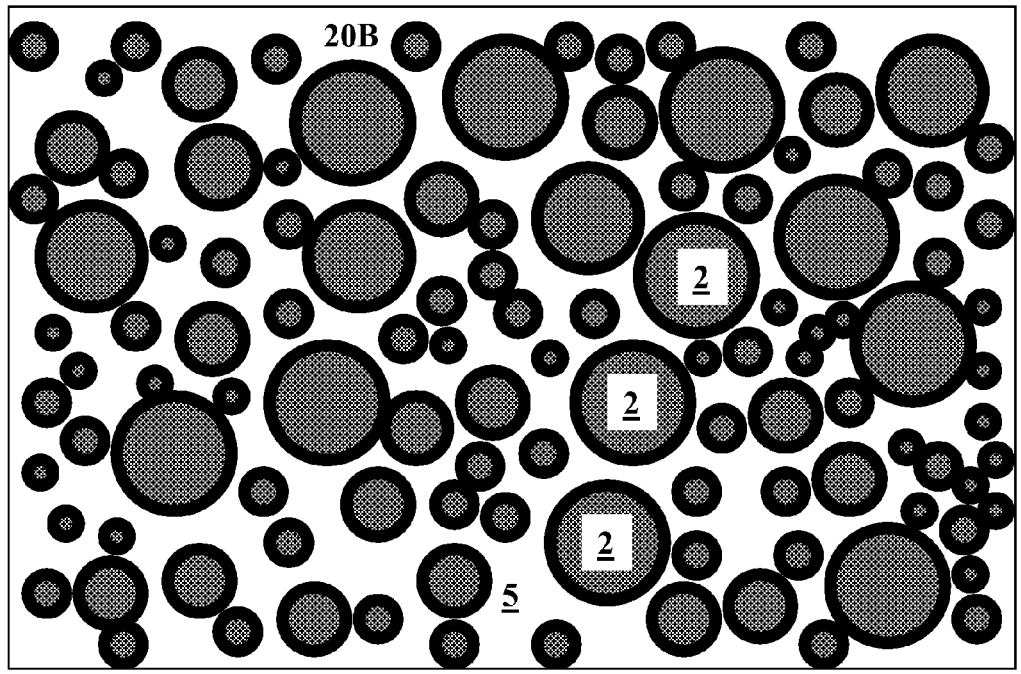
FIGS. 4A and 4B show the system according to the invention in a second embodiment.
Figure 4B:
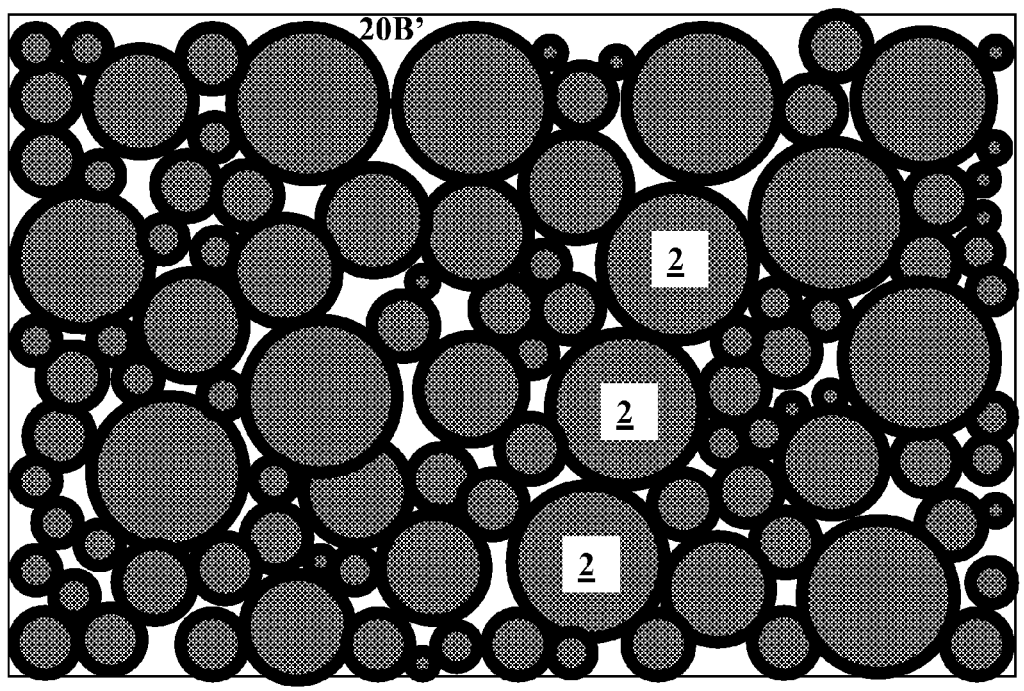

FIG. 4A shows a system 20B of the invention in a second embodiment. The system 20B is made exclusively of material 2 disclosed previously. FIG. 4B shows the swelled system 20B' i.e. after swelling when in contact with the fluid 5. The material 2 swells to form a swelled material 2' and interacts with other swelled material 2' to set into a permeable mass. The swelled system 20B' develops sufficient compressive strength to become a barrier for certain type of particles, as sand for example but remains permeable for fluids such as oil, gas or water. Accordingly, combination of various diameters of material 2 can be used and chosen in such a way that the swelled materials 2' ensure a sufficient compressive strength of the system 20B'. Also monotype of material 2 can be used and chosen in such a way that the swelled materials 2' ensure a sufficient compressive strength for all the system 20B'. For example, assuming system 20B is made of monodisperse particles with a total diameter of 1 millimeter (in the range of 16/20 US mesh proppant) pumped at a solid volume fraction (SVF) of 40%. To reach a random close packing SVF of 64% the swollen radius should be $r'_3=r_3 \cdot (64/40)^{1/3}$, so $r'_3=1.17 \cdot r_3$. Assuming that the swellable material can expand 100% then the first layer must be 85 micrometers thick. This is close to the thickness of layers used in typical resin coated proppant. In this way no particular process to produce the material has to be developed, as conventional manufacturing processes can be used. In this embodiment, the system is made of particles of material with an average diameter of the core between 300 to 1400 micrometers Another aspect of the invention is to disclose a method to treat the well with the system 20A, 20B and other embodiments of the invention. The material 2 can be pumped into the well through conventional placement techniques as the material will be initially present as a pumpable suspension. In a first embodiment, the method uses a system self-activated, and the material 2 is mixed with the carrier fluid embodied as fluid 5 which does not impact the first layer sufficiently to initiate immediate swelling. So, the material 2 with this fluid 5 is in the form of suspension. This suspension can be pumped directly into the well to a predetermined zone or near said zone. The zone may be any location of the well needing the installation of a permeable barrier. The suspension can be placed in the zone using methods as disclosed in European patent applications from the applicant under number 06290511.2; 06290700.1; or 06290518.7. So a third element embodied as a perforated tubular allows placement of the suspension. At this stage, the material 2 will be in contact with the fluid 5 for sufficient time so to transform into swelled material 2'. The system 20A' or 20B' made of swelled material 2' and third element 3 thus creates a permeable, consolidated barrier when set. The sand, other rock particles, as debris or other particles present in the well are retained by said barrier but fluids such as water, oil or gas can flow through the said permeable barrier. This permeable mass set without requiring leak off (as in the case of gravel-packing) or sedimentation (as mentioned previously). Also, this permeable mass will be able to resist flow of formation fluids or post treatment with acid. In a second embodiment, the method uses a system activated externally, and the material 2 is mixed with a second fluid i.e. the fluid carrier which does not react with the first layer or at least which does not impact the first layer sufficiently to initiate immediate swelling. This carrier fluid may be the fluid 5, but not necessarily. In the same way, this suspension can be pumped directly into the well to a predetermined zone or near said zone. The suspension can be placed in the zone using methods as disclosed in European patent applications from the applicant under number 06290511.2; 06290700.1; or 06290518.7. At this stage, the system is activated thanks to an external factor so the material is able to swell. A first possibility is that the system is put in contact with the fluid 5 through osmosis or diffusion in the zone of fluid 5. A second possibility is activation of swelling by temperature, U.V. radiation or other chemicals. Also according to a third possibility, the second layer may be unprotected as disclosed above to allow swelling of the first layer. The system 20A' or 20B' made of swelled material 2' and third element 3 thus creates a permeable, consolidated barrier when set. The sand, other rock particles, as debris or other particles present in the well are retained by said barrier but fluids such as water, oil or gas can flow through the said permeable barrier. This permeable mass set without requiring leak off (as in the case of gravel-packing) or sedimentation (as mentioned previously). Also, this permeable mass will be able to resist flow of formation fluids or post treatment with acid. For example, the method of the invention can be used for sand control.

According to a further aspect of the invention other components may be added to the material or system of the invention. The second fluid may include acids, chelating agents, enzymes, or breakers. Said further components will help to remove the drilling fluid filtercake during and after placement of the suspension according to the invention. Examples of components can be found in U.S. Pat. No. 6,569,814 and U.S. Pat. No. 6,631,764. The second fluid can also include viscosifiers, antifoams, fluid loss control agents, retarders or accelerators of the glue.

The invention claimed is:

1. A permeable composition, comprising:
(i) a core composed of a solid material;
(ii) a first layer surrounding the core composed of a swellable material that is able to swell in contact with a fluid wherein the fluid is one or more members of the list consisting of: aqueous fluids, non-aqueous fluids, foams and emulsions prepared from two effectively immiscible fluids; and
(iii) a second layer surrounding the first layer composed of an adhesive material able to adhere to a third element, wherein the third element is one or more members of the list consisting of: mineral particles, ceramic particles and organic polymer particles;
wherein, the second layer is able to retard contact of the fluid with the first layer, and the second layer is sufficiently flexible to remain intact as the first layer swells.

2. The composition according to claim 1, wherein the diameter of the core is between 200 and 1600 micrometers, the thickness of the first layer is between 40 and 120 micrometers, and the thickness of the second layer is between 20 and 60 micrometers.

3. The composition according to claim 1, wherein the thickness of the first layer increases to between 50 and 300 micrometers upon contact with the fluid.

4. A permeable system comprising a:
(i) a plurality of particles, each comprising:
(a) a core composed of a solid material;
(b) a first layer surrounding the core composed of a swellable material that is able to swell in contact with a fluid wherein the fluid is one or more members of the list consisting of: aqueous fluids, non-aqueous fluids, foams and emulsions prepared from two effectively immiscible fluids; and
(c) a second layer surrounding the first layer composed of an adhesive material able to adhere to a third element wherein the third element is one or more members of the list consisting of: mineral particles, ceramic particles and organic polymer particles;
wherein, the second layer is able to retard contact of the fluid with the first layer, and the second layer is sufficiently flexible to remain intact as the first layer swells; and
(ii) one or more particles comprising the third element.

5. The system according to claim 4, further comprising a fluid to activate swelling of the first layer.

6. The system of claim 5, further comprising a second fluid that does not react with the first layer, such that said system forms a pumpable suspension that can be placed in a well.

7. A method for treating a well comprising:
(i) selecting a zone to treat;"
(ii) pumping a suspension into or near the zone, the suspension comprising:
(a) a core composed of a solid material;
(b) a first layer surrounding the core composed of a swellable material that is able to swell in contact with a fluid wherein the fluid is one or more members of the list consisting of: aqueous fluids, non-aqueous fluids, foams and emulsions prepared from two effectively immiscible fluids; and
(c) a second layer surrounding the first layer composed of an adhesive material able to adhere to a third element wherein the third element is one or more members of the list consisting of: mineral particles, ceramic particles and organic polymer particles; and wherein, the second layer is able to retard contact of the fluid with the first layer, and the second layer is sufficiently flexible to remain intact as the first layer swells;

(iii) exposing the suspension to the third element; and (iv) allowing the first layer to swell upon contact with the fluid such that the suspension forms a barrier that is permeable to fluids.

8. The method of claim 7, wherein the third element is already present in the well.

9. The method according to claim 7, wherein the permeable system provides sand control in the well.

* * * * *

UNITED STATES PATENT AND TRADEMARK OFFICE
CERTIFICATE OF CORRECTION

| | | |
|---|---|---|
| PATENT NO. | : 8,680,027 B2 | Page 1 of 1 |
| APPLICATION NO. | : 12/062620 | |
| DATED | : March 25, 2014 | |
| INVENTOR(S) | : Simon G. James | |

It is certified that error appears in the above-identified patent and that said Letters Patent is hereby corrected as shown below:

On the title page items 12 and 75

Sole inventor's name should read

Simon G. James

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,680,027 B2 | Page 1 of 1 |
| APPLICATION NO. | : 12/062620 | |
| DATED | : March 25, 2014 | |
| INVENTOR(S) | : Simon G. James | |

It is certified that error appears in the above-identified patent and that said Letters Patent is hereby corrected as shown below:

On the title page, item (12) "Simon" should read -- James --

On the title page, item (75)

Sole inventor's name should read

Simon G. James

This certificate supersedes the Certificate of Correction issued July 8, 2014.

Signed and Sealed this
Fifth Day of August, 2014

Michelle K. Lee
*Deputy Director of the United States Patent and Trademark Office*